(12) United States Patent
Kim et al.

(10) Patent No.: US 8,791,610 B2
(45) Date of Patent: Jul. 29, 2014

(54) ANTI-SEPARATING STRUCTURE OF SENSING MAGNET FOR EPS MOTOR

(75) Inventors: Byungyong Kim, Seoul (KR); Yongchul Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 86 days.

(21) Appl. No.: 13/269,997

(22) Filed: Oct. 10, 2011

(65) Prior Publication Data

US 2012/0091830 A1  Apr. 19, 2012

(30) Foreign Application Priority Data

Oct. 8, 2010  (KR) .................... 10-2010-0098427

(51) Int. Cl.
 *H02K 11/00* (2006.01)
(52) U.S. Cl.
 USPC ........................................ 310/68 B

(58) Field of Classification Search
 USPC ................ 310/68 B, 156.05–156.07
 See application file for complete search history.

(56) References Cited

U.S. PATENT DOCUMENTS 5,783,880 A * 7/1998 Teshima et al. ............. 310/67 R
6,198,185 B1 * 3/2001 Bruhn et al. ................. 310/68 B

* cited by examiner

*Primary Examiner* — Dang Le
(74) *Attorney, Agent, or Firm* — Saliwanchik, Lloyd & Eisenschenk

(57) ABSTRACT

Disclosed is an anti-separating structure of a sensing magnet for EPS motor, capable of applying a mechanical coupling force to a magnet and a plate to stably prevent the magnet from being disengaged to an axial and rotational direction, the structure including a plate, and a magnet formed on an upper surface of the plate and injection molded along with the plate, whereby a manufacturing process can be simplified to achieve an excellent adhesive strength.

6 Claims, 6 Drawing Sheets

ANTI-SEPARATING STRUCTURE OF SENSING MAGNET FOR EPS MOTOR

CROSS-REFERENCE TO RELATED APPLICATION

This application claims the benefit under 35 U.S.C. §119 of Korean Application No. 10-2010-0098427, filed Oct. 8, 2010, which is hereby incorporated by reference in its entirety.

BACKGROUND

1. Field of the Disclosure

The present disclosure relates to a coupling structure between a sensing magnet and a plate of an EPS motor, and more particularly to an anti-separating structure of a sensing magnet for an EPS motor equipped with a structure to apply a mechanical force to a magnet and a plate, thereby stably preventing the magnet from disengaging to an axial and rotational direction.

2. Discussion of the Related Art

Generally, almost every vehicle employs an electric power-assist steering system. Such an electric power-assist steering system generates an assist force based on the steering torque and the steering angle, so as to enhance the steering performance of the vehicle.

That is, a steering system that assists a steering force of a vehicle with a separate power is used to enhance the motion stability of a vehicle.

Conventionally, the auxiliary steering device uses hydraulic pressure, but an Electronic Power Steering (EPS) system adapted to transmit a rotation output of an electric motor to a steering shaft via a speed reduction mechanism has been increasingly employed these days from a viewpoint of a reduction in engine load, a reduction in weight, an enhanced steering stability and a quick restoring force.

The EPS system is such that an Electronic Control Unit (ECU) drives a motor in response to steering conditions detected by a speed sensor, a torque angle sensor and a torque sensor to enhance a steering stability and provide a quick restoring force, whereby a driver can safely steer a vehicle.

The EPS system is also such that a motor assists a torque manipulating a steering wheel to allow a driver to steer a vehicle with less power, where the motor employs a Brushless Direct Current (BLDC) motor.

The BLDC motors have been increasingly used because the brushless motors are excellent in maintenance property, have a small size, and are capable of generating a high torque. The BLDC motor is a DC motor mounted with an electronic rectifying system, excluding those mechanical contact portions such as a brush and a rectifier from the conventional DC motor.

FIG. 1 is a lateral cross-sectional view of an EPS motor according to prior art. Referring to FIG. 1, the EPS motor includes a substantially cylindrical upper-opened housing (1), and a bracket (2) coupled to an upper surface of the housing (1) to form a general exterior look of the EPS motor.

The housing (1) and the bracket (2) are respectively supported by a rotation shaft (3). An upper surface of the rotation shaft (3) is connected to a steering shaft of a vehicle to provide a power to assist the steering of the vehicle. A periphery of the rotation shaft (3) is arranged with a rotor (5) formed with a core and a magnet. The housing (1) is connected at an inner circumferential surface to a stator (4) formed with a core and a coil to provide an electromagnetic force to the periphery of the rotor (5).

In a case a current is provided to the stator, the rotor (5) is rotated by electric interaction between the rotor and the stator to rotate the rotation shaft (3), thereby assisting rotation of the steering shaft.

The bracket (2) is formed thereon with a printed circuit board (PCB. 8) arranged with a sensor (9). The sensor (9) is discretely formed on an upper surface of the PCB (8) at a predetermined space to allow a plate (6) to rotate with the rotation shaft (3). A magnet (7) is formed at a lower side of the plate (6). The magnet (7) is rotated with the rotation of the rotation shaft (3) to calculate a rotational angle in response to magnetic flux generated by rotation detected by the sensor (9).

Thus, an appropriate current is provided to the stator in response to the rotational angle of the rotation shaft at the EPS motor to rotate the rotation shaft, whereby a steering torque can be assisted.

Meanwhile. FIG. 2 is a perspective view illustrating a separated state of a plate and a magnet according to prior art, and FIG. 3 is a perspective view illustrating the plate and the magnet that are coupled.

Generally, if the magnet (7) is magnetized to the plate (6), the plate (6) is coupled to the rotation shaft to a magnetic field direction to detect a position of the rotor (5). At this time, the plate (6) and the magnet (7) are coupled using an adhesive, such that it is difficult to accurately control the adhesive process and there is a probability of the magnet being disengaged from the plate (6).

Particularly, the coupling relationship between the plate and the magnet must be realized by a coupling force alone of the adhesive in view of the characteristics of a vehicle that is affected by various changing environments, which makes the coupling force of the adhesive more important.

The structure of using adhesive leads to a difficulty in choosing an adequate adhesive and an economic problem of using a high-priced adhesive. In addition, a problem arises of requiring an elaborate detailed work process in coating the adhesive.

BRIEF SUMMARY

The present disclosure is directed to cope with the above-mentioned problems/disadvantages and it is an object of the present disclosure to provide an anti-separating structure of a sensing magnet for EPS motor, capable of applying a mechanical coupling force to a magnet and a plate to stably prevent the magnet from being disengaged to an axial and rotational direction.

It is another object to provide an anti-separating structure of a sensing magnet for EPS motor capable of quickly realizing a forming process of the magnet and enabling to have an economically excellent structure.

Technical problems to be solved by the present disclosure are not restricted to the above-mentioned description, and any other technical problems not mentioned so far will be clearly appreciated from the following description by those skilled in the art.

In one general aspect of the present disclosure, there is provided an anti-separating structure of a sensing magnet for EPS motor, the structure comprising: a plate; and a magnet formed on an upper surface of the plate and injection molded along with the plate, whereby a manufacturing process can be simplified to achieve an excellent adhesive strength.

Preferably, the plate takes the shape of a disk, and is formed with a vertically penetrating coupling hole, whereby a coupling force between the magnet and the plate can be strengthened.

Preferably, the injection molded magnet includes a downwardly protruding lug for insertion into the coupling hole, whereby a coupling force between the magnet and the plate to a rotational direction can be enhanced.

Preferably, a lower end of the lug is extended to a lower surface of the plate, and a diameter of the lower end of the lug is greater than that of the coupling hole, whereby a coupling force between the magnet and the plate to an axial direction can be enhanced.

Preferably, the coupling hole and the lug are formed in a pair, and opposite to a right angle direction.

The anti-separating structure of a sensing magnet for EPS motor thus configured according to the present disclosure is advantageous in that a coupling force between a plate and a magnet to an axial and rotational direction can be reinforced by mechanical structure in addition to adhesive strength of an adhesive to thereby enhance a structural stability and operational reliability.

Another advantage is that the magnet is magnetized by way of injection molding process to increase a manufacturing efficiency and economical advantage.

BRIEF DESCRIPTION OF THE DRAWINGS

The accompanying drawings, which are included to provide a further understanding of the present disclosure and are incorporated in the present disclosure and constitute a part of this application, and together with the description, serve to explain the principle of the disclosure. In the drawings.

DETAILED DESCRIPTION

Figure 1:
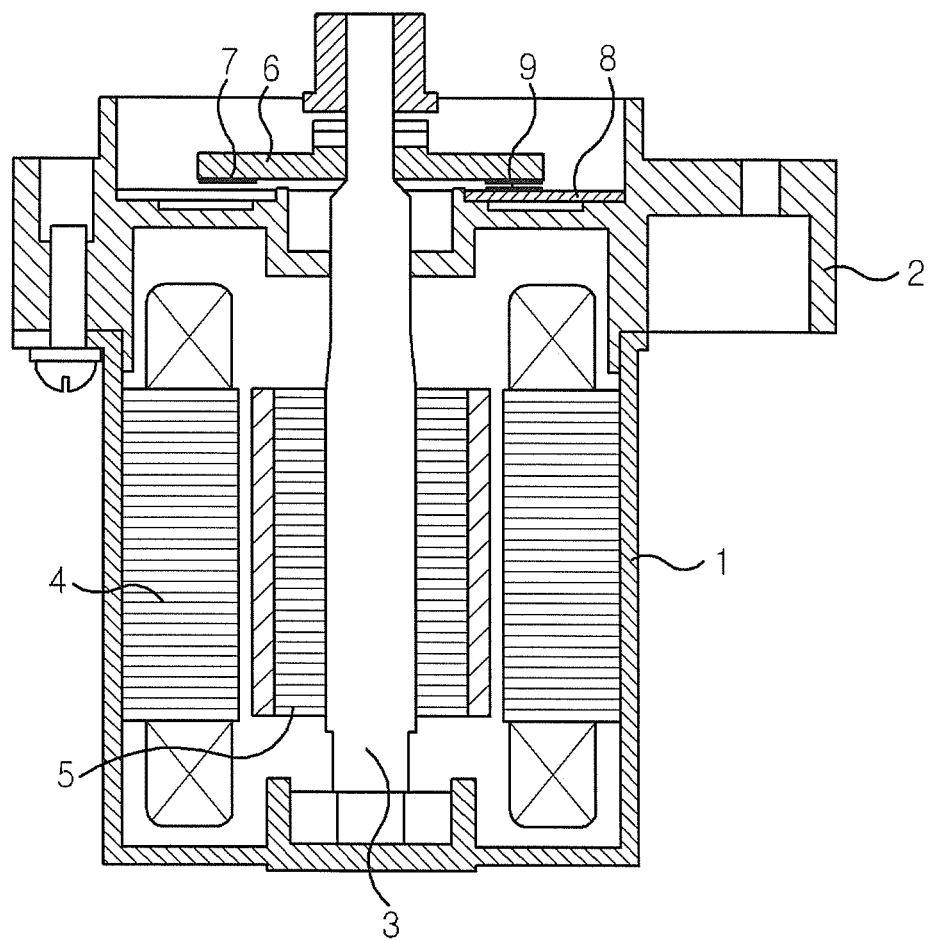
FIG. 1 is a lateral cross-sectional view of an EPS motor according to prior art.
Figure 2:
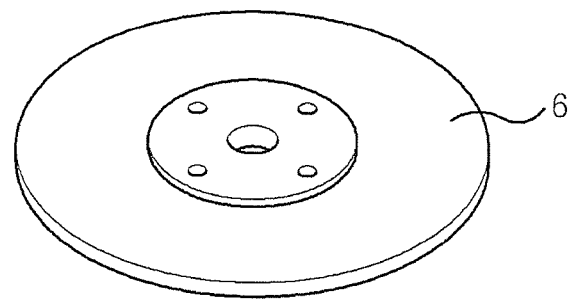
FIG. 2 is a perspective view illustrating a separated state of a plate and a magnet according to prior art.
Figure 2:
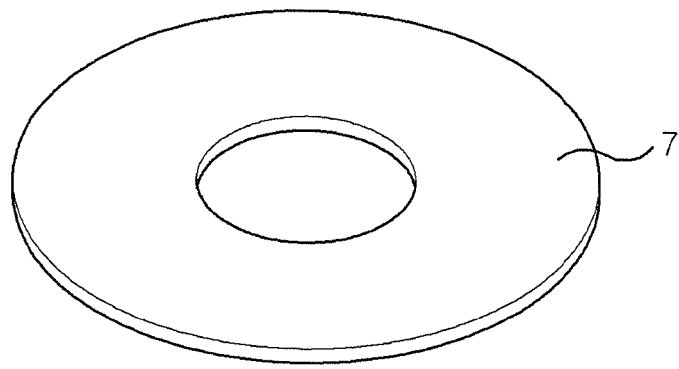
Figure 3:
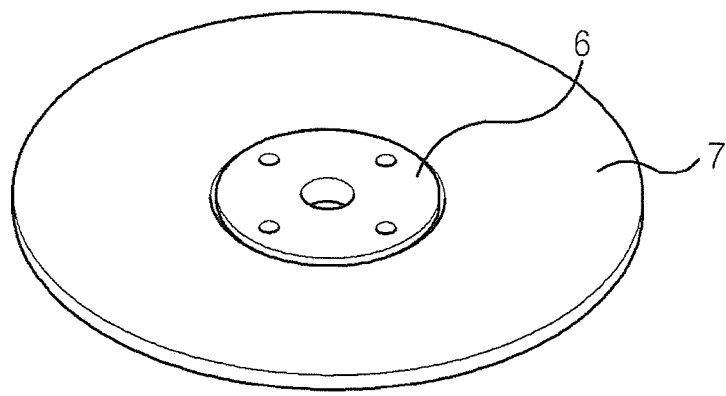
FIG. 3 is a perspective view illustrating the plate and the magnet that are coupled.

Advantages and features of the present invention may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification. The terms "a" and "an" herein do not denote a limitation of quantity, but rather denote the presence of at least one of the referenced item.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera.

Now, anti-separating structure of a sensing magnet for EPS motor according to the exemplary embodiments of the present disclosure will be described in detail with reference to the accompanying drawings.

Figure 4:
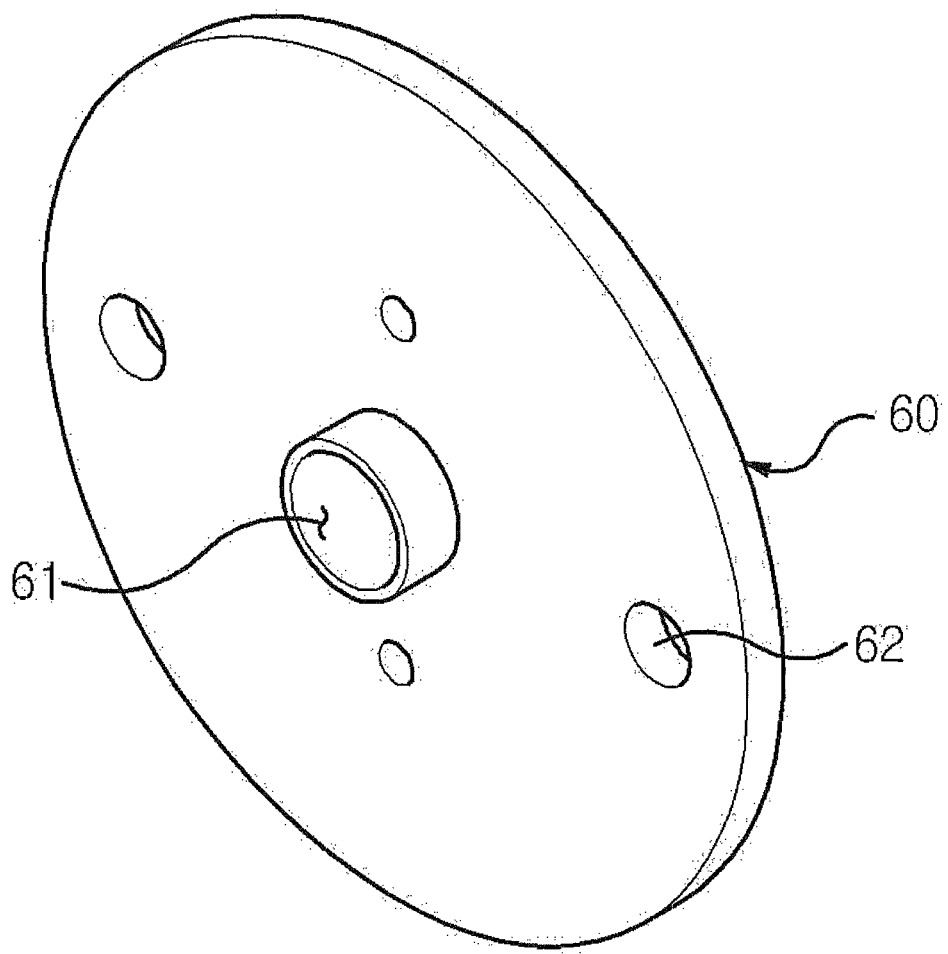
FIG. 4 is a perspective view illustrating a plate of an EPS motor according to the present disclosure.

FIG. 4 is a perspective view illustrating a plate of an EPS motor according to the present disclosure, where a surface of a plate (60) on the drawing is a surface coupled by a magnet, and where a direction coupling with the magnet is defined as an upper direction or an upper side, and a direction opposite thereto is defined as a lower direction or a lower side.

A center of the plate (60) of an EPS motor according to the present disclosure is formed with a vertically penetrating plate opening (61) in which a rotation shaft is inserted and secured.

The plate (60) substantially takes the shape of a disk and is formed with a vertically penetrating coupling hole (62). The coupling hole (62) serves to allow a lug of a sensing magnet to be inserted and secured therein. The coupling hole (62) may be singly or plurally formed, but the coupling hole (62) is preferably formed in a pair to a right angle direction in consideration of coupling force and engineering process. That is, a pair of coupling holes (62) is formed across the plate opening (61), each hole facing the other hole.

More preferably, the plate opening (61) is arranged adjacent to a periphery of the plate (60) to support a rotational direction of the magnet. Although the coupling hole (62) is exemplified to be formed in a pair, it should be apparent that only one coupling hole (62) may be formed, or more than three coupling holes (62) may be formed depending on structural cases.

Figure 5:
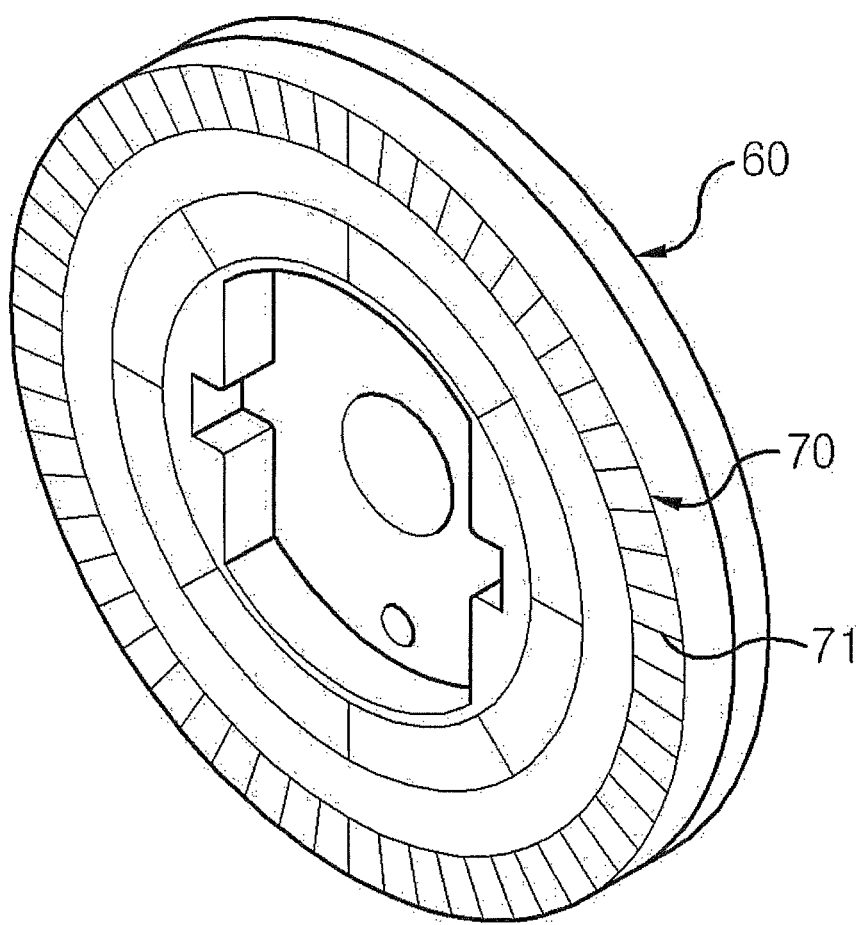
FIG. 5 is a perspective view illustrating a state in which a plate and an injection molded magnet are coupled, from a side of the injection molded magnet according to the present disclosure.
Figure 6:
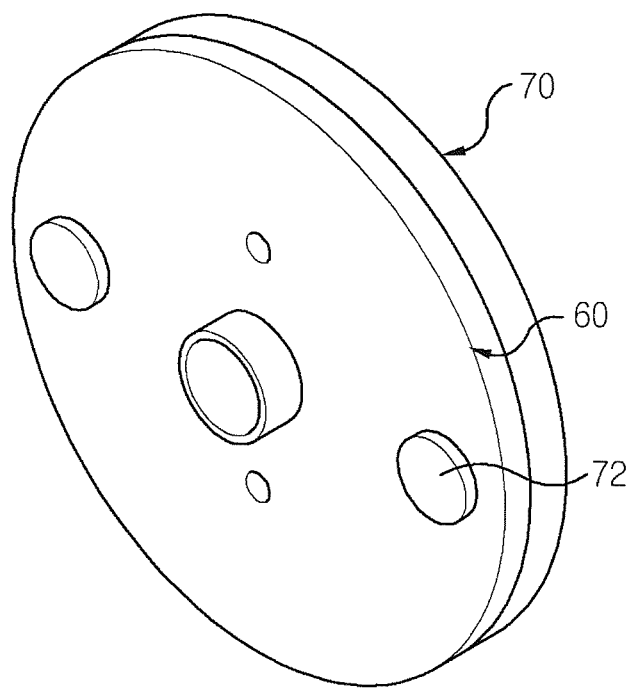
FIG. 6 is a perspective view illustrating a state in which a plate and an injection molded magnet of EPS motor are coupled, from a side of the plate according to the present disclosure.

Meantime, FIG. 5 is a perspective view illustrating a state in which a plate and an injection molded magnet are coupled, from a side of the injection molded magnet according to the present disclosure, and FIG. 6 is a perspective view illustrating a state in which a plate and an injection molded magnet of EPS motor are coupled, from a side of the plate according to the present disclosure.

The sensing magnet of the EPS motor according to the present disclosure is an injection molded magnet (70) that is injection molded on an upper side of the plate (60). Like the plate (60), the injection molded magnet (70) substantially takes the shape of a disk and is centrally formed with a magnet opening (not shown) through which a rotation shaft can pass.

Now, a magnetizing process of the injection molded magnet (70) according to a concept of the present disclosure will be described in detail.

In a case the plate (60) is processed with the coupling hole (62), the plate (60) is inserted into a mold to injection-mold the injection molded magnet (70), whereby the plate (60) and the injection molded magnet (70) can be coupled to have an adequate shape.

Meanwhile, a lower surface facing the plate (60) of the injection molded magnet (70) is preferably formed with a lug (73) for insertion into the coupling hole (62).

The number of lugs (73) is formed in mutual association with the number and position of the coupling holes (62), and more accurately, the lug (73) is formed to match the position and shape of the coupling hole (62) when the plate (60) is injection molded. Therefore, an inner circumference of the coupling hole (62) and an outer circumference of the lug (73) are matched. In this case, even if the lug (73) receives an external force, the magnet (70) serves as a stopper that prevents the injection molded magnet (70) from rotating relative to the plate (60).

Now, the state where the plate (60) and the magnet (70) are coupled will be described in detail with reference to FIGS. 7 and 8.

Figure 7:
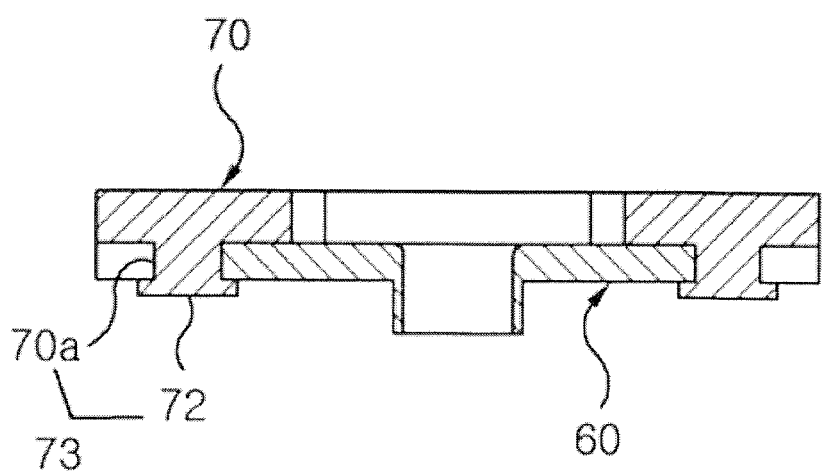
FIG. 7 is a lateral cross-sectional view illustrating a state in which a plate and an injection molded magnet of EPS motor are coupled according to the present disclosure.
Figure 8:
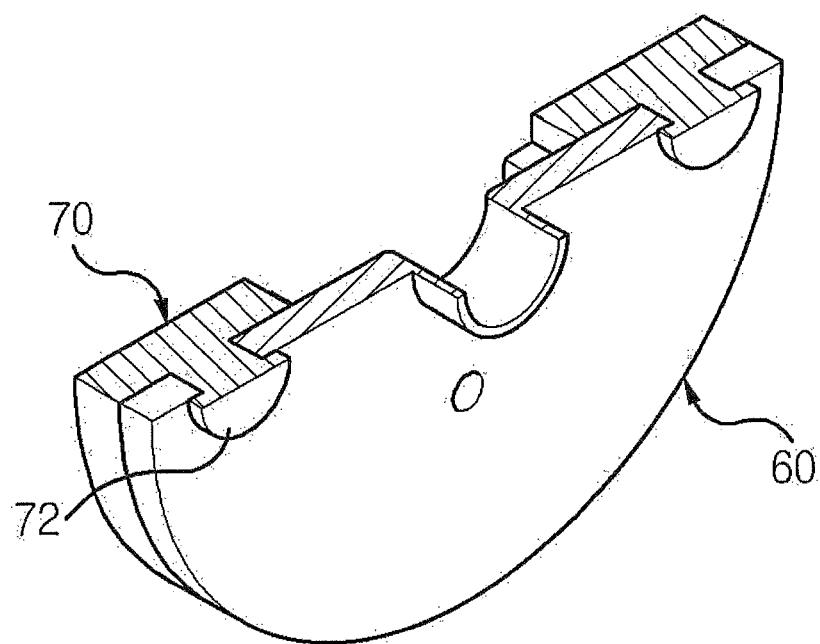
FIG. 8 is a perspective view illustrating a state in which a plate and an injection molded magnet of EPS motor are coupled according to the present disclosure.

FIG. 7 is a lateral cross-sectional view illustrating a state in which a plate and an injection molded magnet of EPS motor are coupled according to the present disclosure, and FIG. 8 is a perspective view illustrating a state in which a plate and an injection molded magnet of EPS motor are coupled according to the present disclosure.

As explained in the above, the magnet (70) is formed on the upper surface of the plate (60) by way of injection molding process. At this time, the injection molded magnet (70) is introduced through the coupling hole (62), whereby, the lug (73) is formed that protrudes downwards.

As illustrated in FIGS. 7 and 8, a distal end of the lug (72) is preferably extended to a lower surface of the plate (60). To be more specifically, a diameter of the distal end of the lug (72) is greater than that of the coupling hole (62), such that the distal end of the lug (72) can be hitched by a part of the lower surface of the plate (60).

The coupling hole (62) substantially takes the shape of a cylinder, whereby a distal end of the lug (72) is shaped of a circle when viewed from a cross-section. Each of the cross-sectional view of the coupling hole (62) and the lug (73) is however not limited thereto, the cross-section may take various shapes including a polygonal shape and a saw-toothed shape depending on selection.

As noted above, because the diameter of the distal end of the lug (72) is greater than that of the coupling hole (62), an area contacting an inner circumferential surface of the coupling hole (62) of the lug (73) is formed with a staircase sill. That is, the diameter of the lug at an upper section (70a) matches that of the coupling hole (62) and the diameter of the lug at a lower section (72) is greater than that of the coupling hole (62).

It should be noted that an axial supporting force of the injection molded magnet (70) is further reinforced by the difference in diameters.

The coupling structure between the sensing magnet of EPS motor and the plate thus configured according to the present disclosure is advantageous in that the magnet is formed by injection molded manner on the plate to simplify the manufacturing process, to reduce the manufacturing cost and time over the prior art.

Furthermore, a supporting force to a rotational direction can be reinforced by the coupling hole of the plate and the lug formed by the injection molded magnet, and a supporting force to an axial direction can be also reinforced by the shape of the lug to thereby enhance the operational reliability.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. An anti-separating structure of a sensing magnet for a motor, the structure comprising:
    a disk-shaped plate including at least one coupling hole with a predetermined size of diameter; and
    a sensing magnet placed on a top surface of the plate, the sensing magnet being surface-contacted with the top surface of the plate;
    wherein the sensing magnet comprises a protruding lug that includes a first protruding portion and a second protruding portion,
    wherein the first protruding portion protrudes axially to fill each of the at least one coupling hole with a first diameter and the second protruding portion protrudes radially to have a second diameter greater than the first diameter, the second protruding portion being in surface-contact with a bottom surface of the plate, and
    wherein the predetermined size of diameter of the at least one coupling hole is constant along a depth of each of the at least one coupling hole.

2. The structure of claim 1, wherein a thickness of the second protruding portion is smaller than a thickness of the plate.

3. The structure of claim 1, wherein the sensing magnet comprises a pair of protruding lugs and wherein two protruding lugs of the pair are symmetrically arranged about a center of the plate.

4. An EPS motor, the motor comprising:
    a stator wound with a coil;
    a rotor installed in a space centrally formed at the stator, rotating inside the space by an electrical interaction between a plurality of magnets and the coil of the stator;
    a sensing unit for sensing rotation information of the rotor; and
    a printed circuit board (PCB) including a magnetic element disposed at a position corresponding to a sensing magnet of the sensing unit;
    wherein the sensing unit comprises,
    a disk-shaped plate including at least one coupling hole with a predetermined size of diameter; and
    a sensing magnet placed on a top surface of the plate, the sensing magnet being surface-contacted with the top surface of the plate;
    wherein the sensing magnet comprises a protruding lug that includes a first protruding portion and a second protruding portion,
    wherein the first protruding portion protrudes axially to fill each of the at least one coupling hole with a first diameter and the second protruding portion protrudes radially to have a second diameter greater than the first diameter, the second protruding portion being in surface-contact with a bottom surface of the plate, and
    wherein the predetermined size of diameter of the at least one coupling hole is constant along a depth of the at least one coupling hole.

5. The motor of claim 4, wherein a thickness of the second protruding portion is smaller than a thickness of the plate.

6. The motor of claim 4, wherein the sensing magnet comprises a pair of protruding lugs and wherein two protruding lugs of the pair are symmetrically arranged about a center of the plate.

* * * * *